July 25, 1967  J. R. DWYER, JR  3,332,410
ENGINE STARTING MECHANISM
Filed July 26, 1965  2 Sheets-Sheet 1
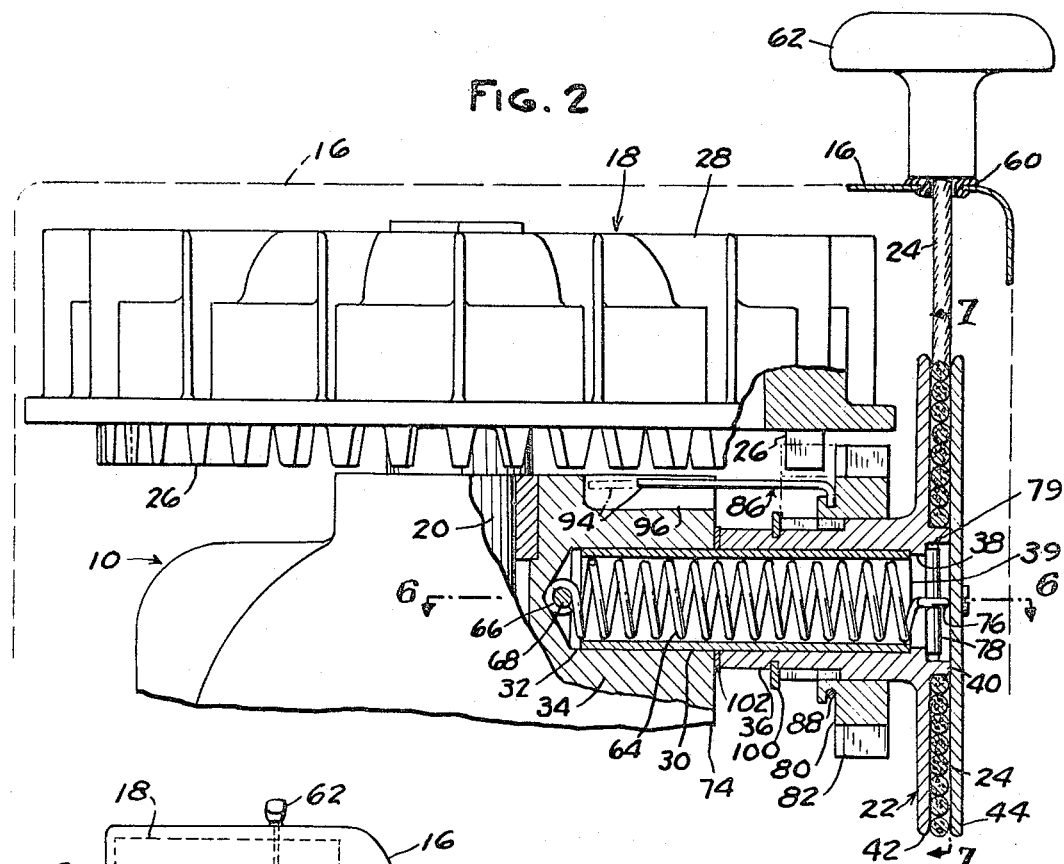
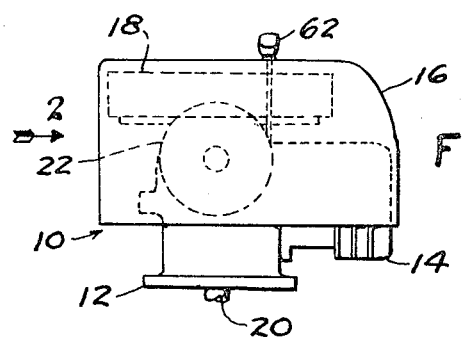
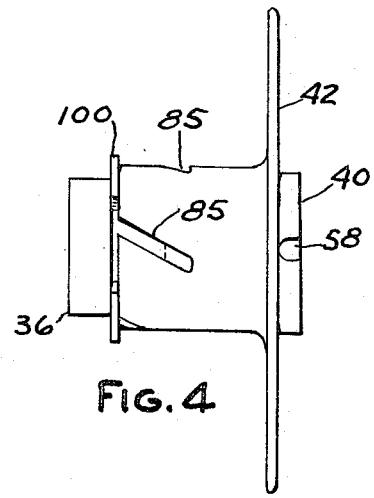
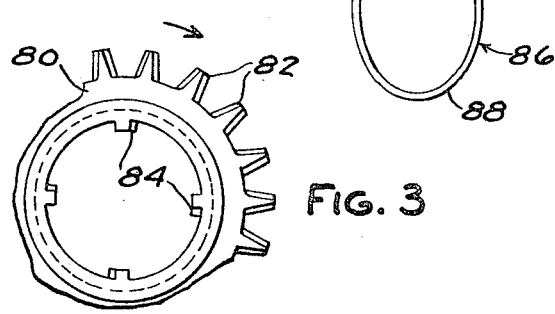
INVENTOR.
JOHN R. DWYER, JR.
BY
Barnes, Kisselle, Raisch & Choate
ATTORNEYS July 25, 1967  J. R. DWYER, JR  3,332,410
ENGINE STARTING MECHANISM
Filed July 26, 1965  2 Sheets-Sheet 2

INVENTOR.
JOHN R. DWYER, JR.
BY
ATTORNEYS

United States Patent Office 3,332,410
Patented July 25, 1967

1

3,332,410
ENGINE STARTING MECHANISM
John R. Dwyer, Jr., Wauwatosa, Wis., assignor to Tecumseh Products Company, Tecumseh, Mich., a corporation of Michigan
Filed July 26, 1965, Ser. No. 474,900
4 Claims. (Cl. 123—185)

ABSTRACT OF THE DISCLOSURE

A rewind pull starter having a pull rope wound on a reel which in turn is journaled on a tube mounted on an engine adjacent gear teeth fixed to the flywheel of the engine. A reel rewind spring is housed within the tube and connected between the engine and reel to retain the reel axially on the tube and to develop force for rewinding the rope on the reel. A pinion is frictionally restrained for axial threading movement on a hub of the reel to thereby engage and disengage the pinion with the flywheel gear teeth in response to rotation of the reel in opposite directions.

---

This invention relates generally to small internal combustion engines equipped with manual starting mechanisms and more particularly to a pull-rope rewind starter adapted to be compactly mounted at the side of such an engine.

It is an object of this invention to reduce the number of parts required for an engine starting mechanism of the pull-rope, spring-rewind type without sacrificing engine starting performance.

Another object of the invention is to so integrate engine and starter parts as to provide a simple and economical engine starting mechanism.

A further object of the invention is to reduce the overall space requirements of an engine by confining the starting mechanism to a hitherto unused space immediately adjacent and generally between the juncture of a side of the engine casing and the flywheel of the engine, which in the case of an engine having a horizontal flywheel, is preferably characterized by the starter mechanism being arranged radially of the flywheel and below it.

Still another object of the invention is to provide simplified structure for mounting a starter on an engine.

Other objects, features and advantages of the invention will be evident from the following description considered with the accompanying drawings in which:

FIG. 1 is an elevational view on a reduced scale of a small internal combustion engine having a side-mounted pull-rope starter in accordance with the present invention.

FIG. 2 is an elevational view of part of the engine of FIG. 1, the starting mechanism being shown in vertical section.

FIG. 3 is a fragmentary detail view of a pinion of the starter.

FIG. 4 is a detail view showing a hub which carries the pinion.

FIG. 5 is a perspective view of a frictional drag spring included in the starter.

Figure 6:
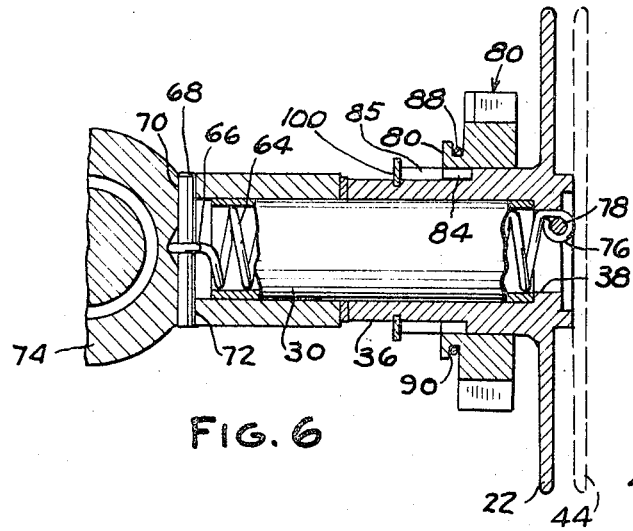
FIG. 6 is a horizontal section of the starter taken along line 6—6 of FIG. 1.

Referring first to FIGS. 1 and 2, there is shown an internal combustion engine 10 which for purposes of illustration may be of the low horsepower two-cycle type having a mounting pedestal 12 adapted to seat on the top panel of a rotary lawn mower or the like (not shown). A finned cylinder 14 is visible under the usual shroud or hood 16, and engine 10 has a horizontal flywheel 18 fixed to the upper end of a vertical crankshaft 20 for rotation therewith, the lower, power takeoff end of the crankshaft projecting downwardly from the engine to carry a rotary cutting blade or other member to be driven by the engine.

Figure 9:
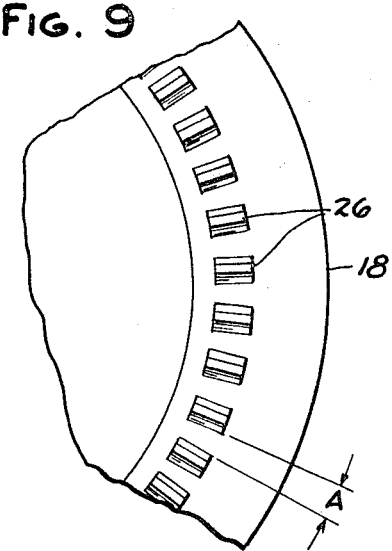
FIG. 9 is a fragmentary plan view of the underside of the flywheel showing the axially projecting teeth of a circular rack gear formed on the flywheel.

As viewed in FIG. 2, flywheel 18 is disposed above the engine and a rope reel 22 is disposed adjacent the right hand side of the engine for rotation in a vertical plane. Preferably reel 22 is in the form of a narrow sheave only slightly wider than one diameter of a pull rope 24 which is wound upon itself in the sheave. Flywheel 18 has a circular row of rack gear teeth 26 integral with and projecting axially or downwardly from its bottom face (FIGS. 2 and 9). A plurality of radial fins 28 are formed on the upper side of flywheel 18 for creating air currents inside hood 16 to aid in cooling the engine.

As best seen in FIG. 2, most of the elements of the illustrated embodiment of the starter mechanism of the present invention are located closely adjacent the right hand side of the engine directly under flywheel 18 and between crankshaft 20 and the outer periphery of the flywheel. The starter mechanism includes a mounting tube 30 which is secured, as by an interference fit, at one end thereof in a blind bore 32 formed in crankcase 34 so as to extend radially of crankshaft 20 and flywheel 18. The opposite end of tube 30 projects from bore 32 and receives for rotation thereon a hollow hub 36 of reel 22. An internal flange 38 of hub 36 abuts the outer free end 39 of tube 30, end 39 thus acting as a stop to limit axial movement of reel 22 inwardly on tube 30. There is a thrust washer 102 between hub 36 and crankcase 34.

Figure 8:
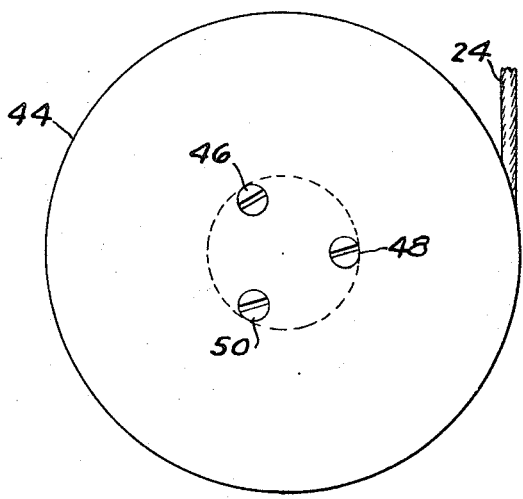
FIG. 8 is an end elevational view similar to FIG. 7 but with the outer sheave cover in place.

The sheave structure of reel 22 comprises an axial extension 40 of hub 36, an external flange 42 integral with hub 36 and a cover 44 detachably secured to hub 36 by screws 46, 48 and 50 (FIG. 8) which screw into threaded holes 52, 54 and 56 formed in hub extension 40. The inner end of pull-rope 24 is passed through a notch 58 (FIG. 4) in extension 40 and is knotted within the bore of the extension to anchor the rope on the reel. After passing radially outwardly through notch 58, rope 24 is wound once around on hub 40 and then on itself in the space between flange 42 and cover 44. The free end of rope 24 passes upwardly through grommet 60 which rims an aperture in hood 16. A handle 62 is secured to the free end of rope 24 and is held upright on grommet 60 by rope tension in a convenient position where handle 62 can be easily grasped and pulled upwardly to start the engine. Alternatively, the free end of rope 24 may extend to the front or back side of hood 16 in applications where it is desired to pull the rope in a horizontal direction.

Figure 7:
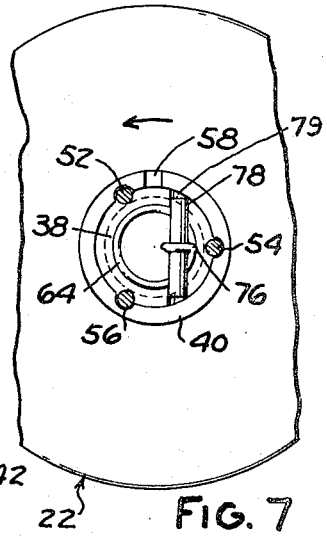
FIG. 7 is a fragmentary end elevational view of the starter parts shown in FIG. 6.

A coil spring 64 is loosely received within tube 30 and serves both as a rewind spring and as a retainer for holding reel 22 on the tube. An eyelet 66 is formed in the left hand end of spring 64 (as viewed in FIGS. 2 and 6) for receiving a pin 68 which is inserted in the eyelet when the same is registered with holes 70 and 72 (FIG. 6) in the wall of crankcase 74, thereby non-rotatably securing the left end of spring 64 to the crankcase. The right end of spring 64 also has an eyelet 76 which receives another pin 78 which seats at its opposite ends in a groove 79 in the outer face of flange 38 and held therein by cover 44, thereby securing the right end of spring 64 to reel 22 for rotation therewith (FIGS. 2, 6 and 7). When spring 64 is thus mounted, it is placed under tension and thus urges reel flange 38 toward tube end 39 and hub 36 against thrust washer 102 to retain the reel on the tube in the position shown. When reel 22 is rotated counterclockwise as viewed in FIGS. 1 and 8 by pulling handle 62 upwardly, spring 64 is twisted in the manner of a torsion spring and stores the applied energy as rope 24 is unwound from reel 22. When the handle is released, spring 64 unwinds and rotates reel 22 clockwise to its initial position, thereby rewinding rope 24 onto the reel.

A pinion 80 is mounted on hub 36 in concentric relation with tube 30 for sliding movement coaxially of the hub and tube and radially of flywheel 18. Pinion 80 has external teeth 82 preferably tapered (FIG. 3) complemental to the angle A of divergence of flywheel teeth 26 (FIG. 9) to facilitate meshing. Pinion 80 also has four helical internal teeth 84 which fit in helical slots 85 formed in hub 36 to provide a driving connection for moving pinion 80 axially, when its rotation is resisted, into and out of mesh with rack teeth 26 on the flywheel, and for rotating pinion 80 when its axial movement is resisted or prevented. Rotation of pinion 80 is resisted by a drag spring 86 (FIGS. 2 and 5) preferably formed from a piece of spring wire bent into a loop portion 88 which is received with a sliding frictional fit in an external groove 90 of a hub 92 of pinion 80 (FIG. 6). The ends of loop 88 are bent at right angles to form two arms or extensions 92 and 94 which project into a recess 96 (FIG. 2) formed in crankcase 34 just below flywheel 18 to thereby prevent rotation of spring 86. Recess 96 is deep enough to accommodate movement of spring arms 92, 94 to the left as spring 86 moves with pinion 80 as the latter moves into full mesh with flywheel rack 26. The end limit of axial travel of pinion 80 toward crankshaft 20 is established by allowing pinion 80 to abut a retaining ring 100 (FIG. 2) in hub 36 located so as to obtain full mesh of the pinion and rack.

In operation, when reel 22 is rotated counterclockwise (as viewed in FIG. 1) by an upward pull on handle 62, the trailing edges of slots 85 engage teeth 84, tending to rotate the pinion in the same direction. However, the frictional drag of spring 86 is sufficient to prevent rotation of the pinion when it is disengaged from the flywheel rack, and hence pinion 80 is driven axially to the left into meshing engagement with flywheel rack 26. When the retaining ring 100 prevents further axial movement of the pinion, the torque applied to reel 22 overrides the drag of spring 86 on pinion 80 and rotates the pinion which in turn rotates the flywheel. When the motor starts, the rotating flywheel overruns pinion 80 and the flywheel now drives pinion 80 axially to the right out of engagement with rack 26. After pinion 80 becomes disengaged from rack 26, it may have enough inertia to carry it to the right until teeth 84 reach the ends of slots 85. If not, then when rope 24 is released, reel 22 will be rotated in the opposite direction by rewind spring 64 whereupon this drag of spring 86 is again sufficient to cause pinion 80 to move axially the remaining distance to the right where it will then rotate with pinion 80 as the reel rewinds the starter rope and returns to its starting position.

From the foregoing description, it is evident that the starting mechanism of the present invention has relatively few parts, and that several of the parts perform multiple functions. Thus, tube 30 serves as a journal for reel 22 and the free end of tube 30 may act as a stop to limit axial movement of reel 22. Tube 30 also houses the coil spring 64. Spring 64 operates as a torsion spring to store energy for rewinding the pull-rope onto reel 22 and also operates as a tension spring for holding reel 14 on tube 30.

The entire starting mechanism is confined to a limited space alongside the engine in normally wasted space beneath the flywheel, thereby reducing overall engine space requirements. This conservation of space results from the compact arrangement of the parts of the starter relative to the flywheel wherein the axes of tube 30, reel 22 and pinion 80 are coincident and extend radially of flywheel 18. With this relationship, the latter parts may be tucked under the flywheel so that the flywheel protects them. Due to this radial arrangement, the pinion engages the axially or downwardly projecting teeth of rack 26 from the side, and thus the pinion and rack teeth engage to provide a positive driving action. The utility of the combination of mounting tube, spring, pinion and reel as described is not limited to a radial arrangement of these parts relative to the flywheel. For example, it would be possible to arrange the axes of tube 30, reel 22 and pinion 80 parallel to the axes of the crankshaft and flywheel to cause pinion 80 to move axially of the flywheel into and out of mesh with teeth on the flywheel's circumference. However, the radial arrangement is preferred for the reasons set forth above and also because it allows pulling force to be applied either parallel to the crankshaft or perpendicular to it. The use of flywheel 18 as part of the starter gear train provides a large diameter driven element and hence a high reduction ratio is obtainable in the starter even when a relatively large pinion 80 is employed, as is desirable for smooth and reliable operation.

What is claimed is:

1. A rewind pull starter for an internal combustion engine having a flywheel with a circular row of teeth thereon, said starter comprising a rigid tubular member adapted to be affixed to the motor adjacent said flywheel teeth, a reel journaled on one end of said tubular member, a pull-rope wound on said reel for imparting rotation thereto, a spring in said tubular member having one end connected to said reel for rotation therewith, means adapted to secure the end of said spring opposite said one end to said engine for tensioning said spring and retaining said opposite end fixed relative to said engine to thereby retain said reel on said tubular member, said spring serving to store energy upon rotation of said reel to return said reel rotationally to an initial position, a pinion movable axially of said tube into and out of mesh with said circular row of teeth, and means operatively connecting said reel to said pinion including mutually cooperative teeth on said pinion and tubular member interengaging each other for moving the pinion into mesh with said circular row of teeth upon actuation of said reel and for moving said pinion out of mesh with said rack upon overrun of said flywheel relative to said pinion.

2. In combination, an internal combustion engine having a casing, a crankshaft projecting from said casing and a flywheel mounted on said crankshaft adjacent said casing having a circular row of gear teeth projecting axially from the side of said flywheel facing said casing, a rewind pull starter comprising a rigid tube mounted at one end on said casing adjacent said facing side of said flywheel, said tube having a free end, a reel journaled on said tube adjacent the free end thereof and carrying a flexible pull element normally wound thereon, a rewind spring supported by said tube and operably connected at its opposite ends to said reel and said engine respectively such that said spring yieldably opposes rotation imparted to said reel by pulling on said flexible element and serves to return said reel to an initial position, a pinion concentrically mounted on said tube and movable axially thereof into and out of mesh with said flywheel teeth, and a driving connection between said reel and said pinion for causing said movement of said pinion into mesh with said rack upon actuation of said reel and for causing demeshing movement of the pinion when the flywheel teeth overrun said pinion, said rigid tube having said one end received in a bore in said engine casing, said spring comprising a helical coil spring received within said tube and maintained under tension between said reel and engine to thereby urge said reel toward said one end of said tube, said spring being torsionally stressed when said reel is rotated by pulling on said flexible element to thereby develop rewind energy for returning said reel to an initial position.

3. The combination set forth in claim 2 wherein said driving connection further includes a hub fixed to said reel and positioned about said tube, said hub having a helical slot therein, said pinion being slidably mounted on said hub and having an internal projection received in said slot.

4. The combination set forth in claim 3 wherein said driving connection further includes a spring wire slidably frictionally engaging said pinion and having an extension projecting therefrom, said casing having a recess therein receiving said extension and adapted to prevent rotation of said spring with said pinion but adapted to permit bodily movement of said spring wire axially of said shaft within the limits of axial meshing and demeshing movement of said pinion.

References Cited
UNITED STATES PATENTS

| | | | |
|---|---|---|---|
| 2,655,047 | 10/1953 | Smith | 123—179 |
| 2,938,511 | 5/1960 | Pike et al. | 123—185 |
| 2,987,059 | 6/1961 | Mendenhall et al. | 123—185 |
| 3,088,445 | 5/1963 | Gardner | 123—179 X |

MARK NEWMAN, *Primary Examiner.*

WENDELL E. BURNS, *Examiner.*